Jan. 30, 1923.
A. VISCHER, JR.
GOVERNOR.
FILED MAR. 7, 1919.
1,443,664
4 SHEETS-SHEET 1
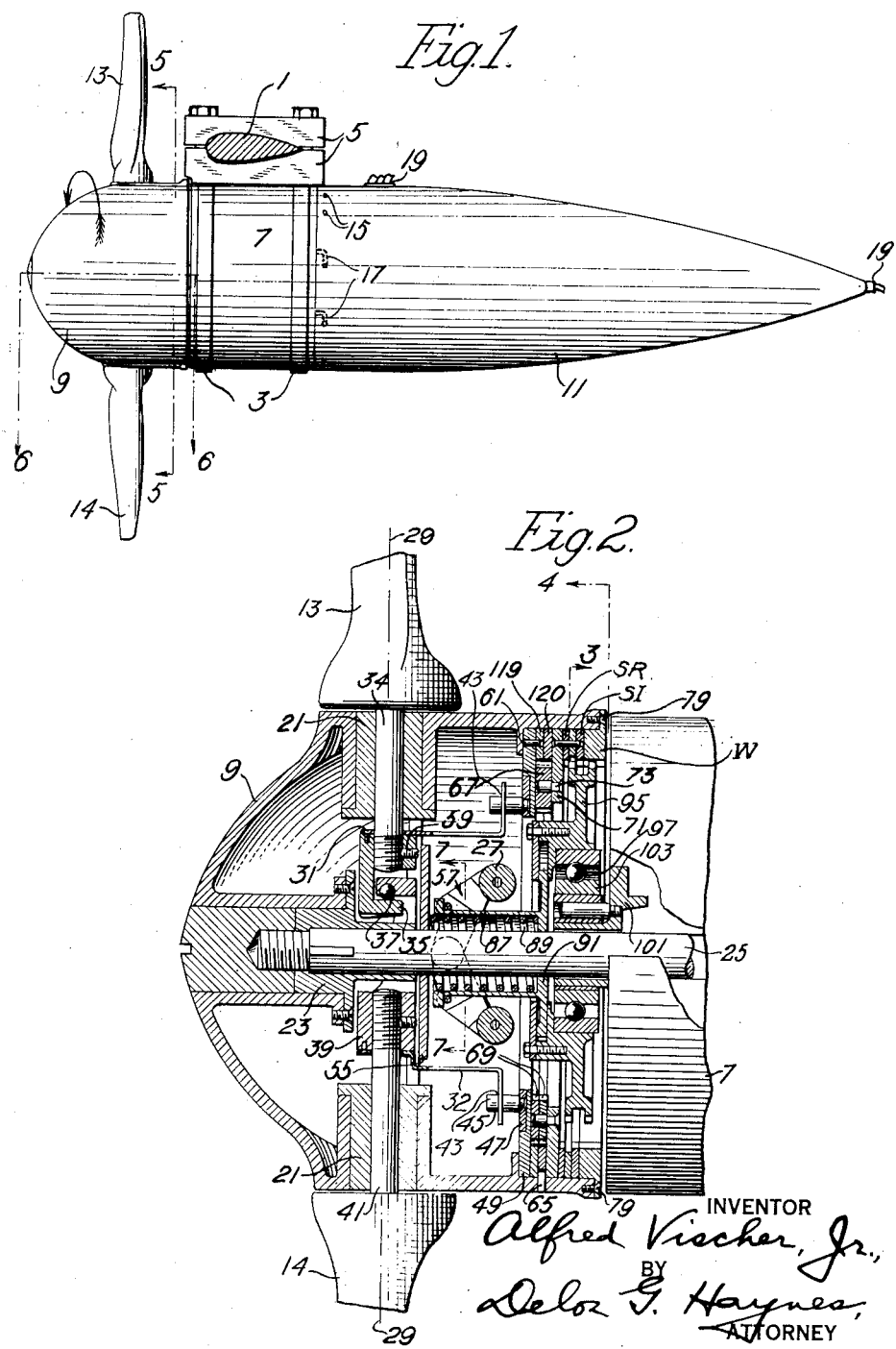

Jan. 30, 1923.

A. VISCHER, JR.
GOVERNOR.
FILED MAR. 7, 1919.

INVENTOR
Alfred Vischer, Jr.,
BY
Delos G. Haynes,
ATTORNEY

Jan. 30, 1923.

A. VISCHER, JR.
GOVERNOR.
FILED MAR. 7, 1919.

INVENTOR
Alfred Vischer, Jr.,
BY Delos G. Haynes,
ATTORNEY

Jan. 30, 1923. 1,443,664
A. VISCHER, JR.
GOVERNOR.
FILED MAR. 7, 1919. 4 SHEETS-SHEET 4

Alfred Vischer Jr., INVENTOR
BY Delor G. Haynes, ATTORNEY

Patented Jan. 30, 1923.

1,443,664

UNITED STATES PATENT OFFICE.

ALFRED VISCHER, JR., OF NEW YORK, N. Y.

GOVERNOR.

Application filed March 7, 1919. Serial No. 281,186.

*To all whom it may concern:*

Be it known that I, ALFRED VISCHER, Jr., a citizen of the United States, and a resident of the city of New York, in the county of Kings and State of New York, have invented an Improvement in Governors, of which the following is a specification.

This invention relates to governors and propeller constructions, and with regard to certain more specific features, to governors co-operating with air-driven or air-driving propellers.

Among the several objects of the invention may be noted the provision of durable and reliable means for governing the speed of a shaft or other rotating element; the provision of inexpensive and accurate mechanism for adjusting the angle of a propeller blade; the provision of a compact and simple device for effecting a speed-controlling action upon a rotating element; and the provision of apparatus of the above type adapted to withstand severe service and to operate with great accuracy under widely varying operating conditions. Other objects will be in part obvious and in part pointed out hereinafter.

The invention accordingly comprises the features of construction and operation, combinations of elements and arrangements of parts which are exemplified in the structure hereinafter described and the scope of the application of which will be indicated in the following claims.

In the accompanying drawings, in which is shown one of various possible embodiments of this invention, Figure 1 is a longitudinal elevation, partly in section, showing a preferred form of air-driven apparatus, mounted on an airplane.

Figure 2 is a longitudinal, vertical section of Figure 1.

Similar reference characters refer to corresponding parts throughout the several views of the drawings.

Figure 3:
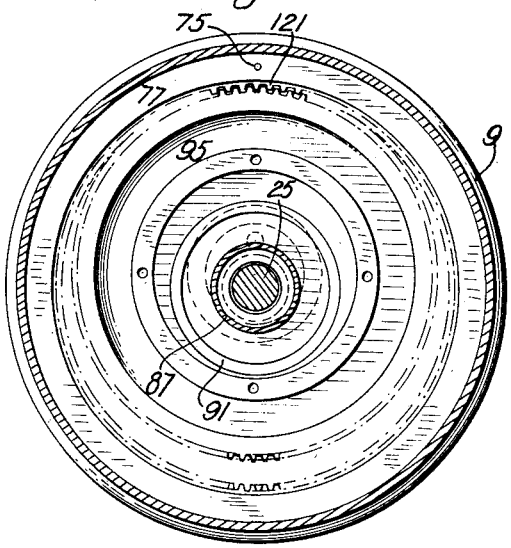
Figure 3 is a section on the line 3—3 of Figure 2, showing the governor gearing in front elevation, with the governor balls and adjacent parts removed.
Figure 4:
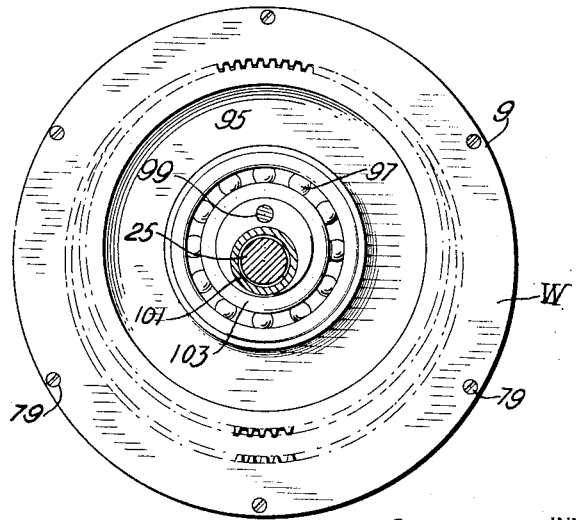
Figure 4 is a section on the line 4—4 of Figure 2, showing the governor gearing in rear elevation.

Referring now more particularly to Figure 1, there is shown at 1 the strut of an airplane, to which is secured by means of the bands 3 and blocks 5 the housing of a generator 7, at the front end of which is revolubly mounted a head 9, and at the rear end of which is secured the tail-piece 11 carrying suitable apparatus such as a wireless telegraph device.

The head 9 carries the propeller blades 13, 14, projecting therethrough, and inside this head is mounted the governor and associated parts.

The tail-piece is fixed with respect to the generator 7 by pins 15 engaging bayonet slots 17. The electric wires from the generator to the tail-piece do not appear on the drawings. Wires from the tail-piece to other apparatus on the airplane are indicated at 19 in Figure 1.

The head 9, with its blades 13, 14, is shown in Figure 2 as including bearings 21 in which the blades are free to rotate and free to move axially through a slight distance; a sleeve 23 keyed to the main shaft 25; governor balls 27 adapted to fly outwardly upon increase of speed; and mechanism whereby the outward and inward movement of the governor balls causes the blades to be rotated about the blade axis 29 in order to increase the amount of blade surface facing the wind when the speed of the main shaft needs to be increased, and to decrease the amount of blade surface facing the wind when the speed of the main shaft needs to be decreased to keep the speed constant. This mechanism comprises a differential or planetary gear train transmitting motion from the main shaft to the arms 31, 32, that respectively serve to turn the blades 13, 14, about the blade axis 29; and a device shifted by the radial movement of the governor balls for setting this train into motion in one direction or the other depending on whether a decrease of speed or an increase of speed is needed. That is, upon a decrease of speed below normal, the governor balls move inwardly from their normal position, and this connects up the gear train so that motion of the main shaft rotates the blades to increase the amount of blade surface facing the wind (Figure 8) and therefore to bring the speed up to normal again. When the speed gets up to normal, the balls are again in their normal position, and this train is disconnected. Similarly, when the speed exceeds normal, the governor balls move outwardly from their normal position, and this connects up the gear train so that motion of the main shaft rotates the blades to decrease the amount of blade surface facing the wind (Figure 8) and therefore to bring the speed down to normal again. When the speed gets down to normal, the balls are again in their normal position, and the train is disconnected again. All this is automatic.

Figure 5:
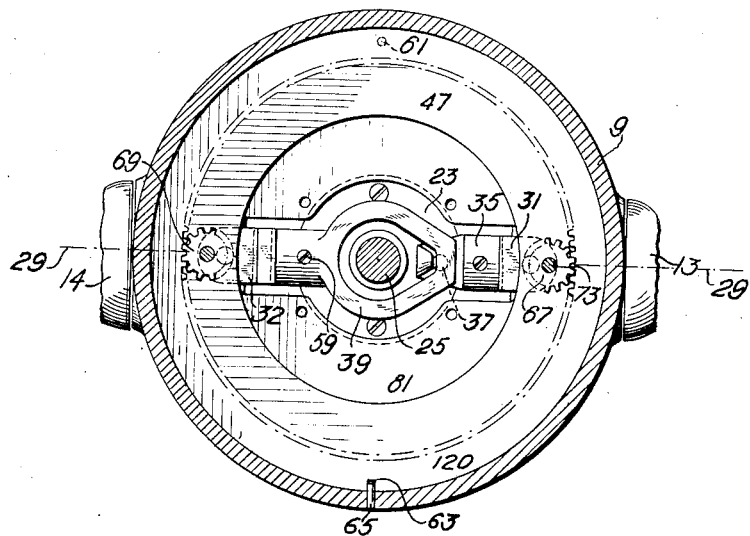
Figure 5 is a section on the line 5—5 of Figure 1, showing in rear elevation the mounting of the propeller blades and the rear portion of the governor gearing.

The blades are connected together by a ball-and-socket joint, shown best in Figure 5. In this figure the upper blade 13 is shown as extending inwardly to a point adjacent but out of contact with the main shaft 25, the blade shaft 34 terminating in a hook 35 having a surface against which the ball 37, carried by the yoke 39 on the shaft 41, (Figure 2) of the blade 14, abuts. This ball is preferably located symmetrically with respect to the blade axis. When the blades rotate about the main shaft (as distinguished from the rotation for adjustment purposes with respect to the blade axis), the centrifugal force of each blade tends to move it radially away from the main shaft, and since the blades are alike, the forces exerted by the two blades are equal. Owing to the ball-and-socket connection between the blades, these equal and opposite forces neutralize one another, and neither force is transmitted to the main shaft or to any other part of the mechanism, the entire strain being borne by the ball 37, which can be made of metal sufficiently hard to withstand the pressure.

For the purpose of adjusting the blade angle, each blade has a flexible phosphor-bronze arm or lever 31, 32, connected to it, as above indicated. The flexibility is in a direction radially of the main shaft; the shape and rigidity of the arms are such that there is no material flexibility in any other direction than this.

Figure 6:
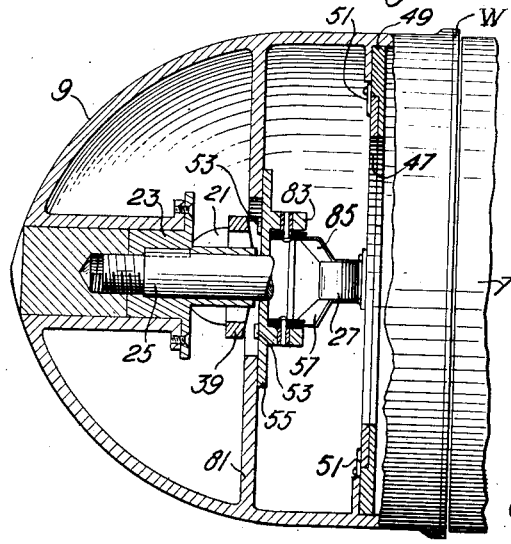
Figure 6 is a fragmentary plan partly in section, on the line 6—6 Figure 1.
Figure 7:
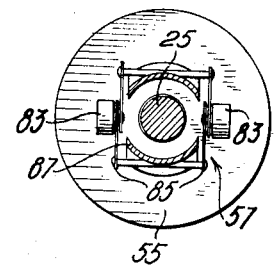
Figure 7 is a vertical section on the line 7—7 of Figure 2, showing the governor ball arms and associated parts.

At the outer end of each flexible arm is an aperture 43 (Figure 2), and in each aperture is a pin 45, fixed to an inner disk 47 that is frictionally mounted in an outer disk 49, which in turn is mounted in the casing 9, the spaced plates 51 (Figure 6) serving to keep the two disks in proper relative alignment, and to maintain or assist in maintaining the desired amount of friction tending to prevent relative rotation of the disks. When the outer disk is rotated relatively to the rotating head 9, the angle or pitch of the two blades is simultaneously changed. The position of the upper blade 13 when its maximum surface is facing the wind is indicated in solid lines in Figure 8, and in said figure the corresponding positions of the pin 45 and arm 31 are likewise indicated in solid lines. The positions of these several parts when the blade has its minimum surface facing the wind, are shown in dotted lines in this figure.

Figure 8:
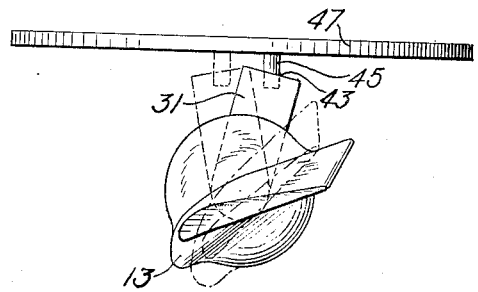
Figure 8 is a fragmentary plan of the upper blade and adjacent parts, showing in solid lines the parts in the positions corresponding to maximum blade surface facing the wind, and in dotted lines the positions corresponding to minimum blade surface facing the wind.
Figure 9:
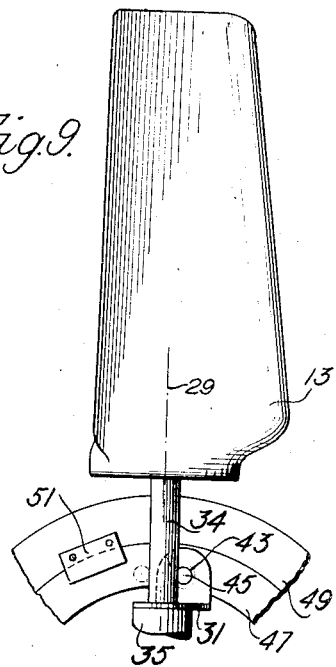
Figure 9 is a front elevation of Figure 8.

The arms 31, 32, are preferably made flexible because the pins 45 rotate in the arc of a circle concentric with the main shaft, while the outer ends of the arms rotate in the arcs of circles concentric with the blade axis (Figures 8, 9). And a sliding fit is provided between the arms 31, 32, and pins 45 to permit relative movement of arms and pins axially of the main shaft; this movement is slight, and is occasioned by the diversity of paths of arms and pins above indicated.

The range of angular adjustment of the blades is limited to some convenient value, such as 20°, (Fig. 8) and it is therefore desirable that the range of movement of the inner disk be confined accordingly. The outer disk, however, is in motion whenever the gear train of the governor is in speed-increasing action or speed-decreasing action, and since such action persists as long as the need for it exists and the driving power (rotation of main shaft) is available, it follows that an over-running relation between the outer and inner disks is advisable. This is provided by the frictional relation of the disks, which normally causes movement of the outer disk to be transmitted to the inner disk, but which permits unlimited relative rotation of the disks when the inner disk has reached the limit of its travel in either direction. This limit may conveniently be determined by pins 53 on the inner plate 55 of the ball-carrying element 57. As will be seen from Figure 6, rotation of the blades and therefore of the link or yoke 39 through a pre-determined distance either way from the mid-position shown in this figure, causes the yoke to abut against one or the other of the pins 53. This stops further rotation of the flexible arms 31, 32, and inner disk 47, but permits further rotation of the outer disk 49.

This lost-motion connection between the outer disk and inner disk is ordinarily not needed where the blade adjustment is made manually, as might be done in certain embodiments of the invention.

The structure and operation, as well as the method of assembling the device, will be clear from the following:

In assembling the mechanism, the hook 35 and yoke 39 attached to the blades 13, 14, respectively, are inserted in place in the forward part of the housing 9, and the blades are screwed therein and secured thereto by set-screws 59 (Figure 2) or other suitable devices. Then the outer disk 49, with the inner disk 47 thereon, is applied, and the pins 45 on the latter are inserted in the holes 43 in the outer ends of the blade arms 31, 32. With these disks in place, rotation of the disks relative to the nose or housing 9 causes the blades to change their angles in synchronism. The relative rotation of the yoke 39 and hook 35 caused thereby, is taken care of by the ball joint between the yoke and hook. It may be noted that this yoke and hook construction may be simplified in case the main shaft does not need to extend as far forwardly as the blade axis. In such case, this construction can be replaced by a simple ball joint between the shafts 34, 41.

The next element to insert in assembling is the gear 119, having, for example, 119 teeth. This gear 119 is applied to a pin 61 extending rearwardly from the outer disk 49, so that rotation of the gear causes rotation of the outer disk (Figs. 2, 5).

Then the narrow fixed gear 120 is applied. This gear has, for example, 120 teeth, and is provided with a notch 63 engaging a pin 65 projecting inwardly from the housing 9, to prevent rotation of this gear 120 with respect to the housing (Figs. 2–5). It is to be understood, of course, that in practice the entire housing and all this governor mechanism inside it, rotates with the rotation of the blades about the axis of the main shaft and that the main shaft rotates as well; in other words, the blades, housing and main shaft normally rotate about the axis of the latter bodily. But for convenience in considering the governor mechanism, the housing will be considered as fixed, as it is the movement of the various elements of the governor with respect to the housing that effects part or all of the governing action.

Figure 10:
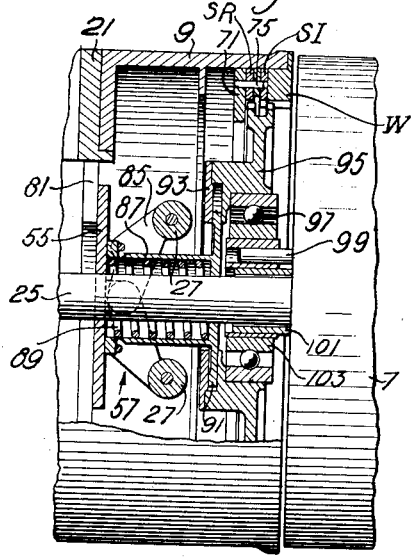
Figure 10 is a fragmentary view similar to Figure 2, showing the governor parts in speed-decreasing position.
Figure 11:
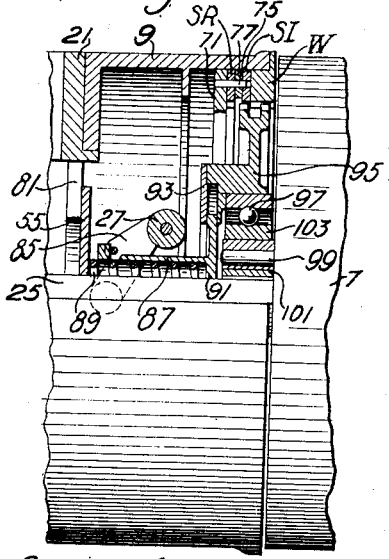
Figure 11 is a similar view showing the governor parts in speed-increasing position.

After the fixed gear 120, the idlers or planet pinions 67, 69, are applied, and then the annulus 71 having the forwardly projecting pins 73 forming studs for the idlers, and having a rearwardly projecting pin 75 for the next gear that is applied, namely, the speed-reducing gear SR, having, for example 119 teeth (Figs. 10–11). Rotation of this annulus clockwise with respect to the housing causes the wide planet idler 67 to rotate one revolution clockwise about the main shaft for each revolution of the annulus clockwise about the main shaft. With each such revolution, the gear 119 is rotated one tooth clockwise. This causes clockwise rotation of the blades about the blade axis, viewing each blade from the main shaft.

The next element to apply is the annular spacer 77, which for convenience has a hole fitting on the above-mentioned pin 75 that projects rearwardly from the annulus 71, (Figs. 2, 3, 10 and 11).

Next, there is applied a speed-increasing gear, SI, having preferably 121 teeth, and having a hole fitting on this same pin 75. This means that the speed-reducing gear SR and this speed-increasing gear SI are both rotated at the same speed as the annulus 71.

The next element to apply is the wide gear W, having preferably 120 teeth. This gear has spaced perforations around its periphery so that it can be secured to the housing 9 by countersunk screws 79, and the forward face of the generator is adjacent the rear face of this gear W, suitable clearance being provided as indicated in Figures 2, 10 and 11, in view of the fact that the gear rotates bodily at the speed of the propeller blades, while the generator frame is fixed.

The next element to apply is the ball-carrying element 57, above mentioned (Figs. 2, 6, 7, 10 and 11). This has an inner plate 55 that can be screwed onto a web 81 of the housing 9 at a point adjacent the propeller yoke and hook, as above indicated. This plate carries the governor arm bearings 83 in which are journaled the governor arms 85 carrying the governor balls 27 above referred to. Movement of the balls radially outwardly causes them to force forwardly toward this plate a hub 87 having inside it a compression spring 89 mounted between the inner plate 55 and the outer flange 91 of the hub in such a way that movement of the hub forwardly toward the plate is resisted by the spring. Loosely carried on this ball-carrying element, between the balls and this outer flange, is an annular plate 93 whose rear face is adapted to be secured against the forward face of the large idler 95 placed eccentricially of the main shaft (Figs. 2, 3, 10 and 11).

This large idler is eccentric with respect to the main shaft, so that the idler always meshes with the fixed gear W, and with either the speed-reducing rotating gear SR, or the speed-increasing rotating gear SI, in (Figs. 2, 10 and 11). For this purpose the idler is provided with two spaced sets of teeth. The idler is mounted in ball-bearings 97 upon a fixed adapter or bushing having an eccentric aperture through which the main shaft passes and having adjacent said aperture a smaller hole for receiving a pin 99 projecting forwardly from the fixed generator frame, so that this fixed adapter will not rotate with respect to the generator frame. This adapter is slidable along a sleeve bearing 101, Figs. 2, 3, 4, 10 and 11, fixed upon the generator and carries the inner ball race 103 The adapter, its sleeve bearing 101, and the inner ball race 103 are the only elements forwardly of the generator that do not rotate with the main shaft.

As above noted, the annular plate 93 on the ball-carrying element has its rear surface screwed to the forward surface of the large idler 95. The plate and the forward surface of the large idler co-operate to hold the rear flange 91 of the sleeve or hub 87 against axial movement with respect to the main shaft and yet permit rotation of the annular plate and large idler eccentrically of said flange, the flange of course being concentric with and carried by and keyed to and rotated by the main shaft.

The operation of the device is as follows:

Assuming that the blades are driven by the wind, the rotation of the blades by the wind causes the housing 9 to rotate, and this causes the main shaft 25 to rotate.

When the speed is normal, the large idler 95 is in the mid-position shown in Figure 2, with its gear meshing, as they always mesh, with the second fixed gear W, and with its forward teeth in the annular space between the speed-reducing gear SR and the speed-increasing gear SI. In this normal position, the large idler, which has, for example, 111 teeth rotates slightly faster than the casing; that is, the idler rotates slowly with respect to the casing, and in the same direction as the casing, with respect to the main shaft. The large idler does not drive any of the other mechanism in the housing, because its forward teeth do not engage either the speed-reducing gear or the speed-increasing gear.

As the speed increases, the forward axial motion of this large idler, effected as above noted by the outward movement of the governor balls, brings the forward teeth of the idler into mesh with the speed-reducing gear (Fig. 10). This connects the speed-reducing train, which operates as follows: For each clockwise rotation (viewed from the rear or generator side) of the housing while this large idler is in its forward or speed-reducing position the speed-reducing gear rotates 1/120 of a revolution clockwise. This effects the rotation of the spacer 77, the annulus 71 and the planet pinions through 1/120 revolution clockwise. For each rotation of the planet pinions clockwise about the main shaft, the gear 119 is caused to rotate 1/120 of a revolution clockwise with respect to the annulus, as above noted. This effects a gear reduction of 14,400 to 1 within a small space, and without detrimental lost-motion. Clockwise rotation of the gear 119 causes clockwise rotation of the outer disk 49. Clockwise rotation of the outer disk tends to cause clockwise rotation of the inner disk 47 and of the propeller arms 31, 32, carried thereby. If the propeller arms are not at the limit of their movement in the direction in which the outer disk tends to move them, then they are moved by the outer disk acting through the inner disk. If, however, the blades have already reached the limit of their movement in such direction, the outer disk simply slips upon the inner disk. When the movement of the blades is sufficient to restore the generator speed to its proper value, the inward travel of the generator balls permits the spring 89 to force the large idler rearwardly until the forward teeth of the latter are again in the space between the speed-reducing gear and the speed-increasing gear, thereby stopping further alteration of the blade angle (Fig. 2).

If the speed of the main shaft drops below normal, the governor balls move inwardly from their normal position and permit the spring 89 to force the large idler rearwardly so that its forward teeth come into mesh with the speed-increasing gear (Fig. 11). This connects the speed-increasing train, by virtue of which for each clockwise revolution of the large idler about the main shaft, the speed-increasing gear moves 1/120 of a revolution counter-clockwise, forcing the annulus 71 and planet pinion 67 1/120 of a revolution counter-clockwise. The planet pinion then acts through the same mechanism as before, but in reverse direction, to effect a shift of the blade angle in speed-increasing direction until normal speed is restored, at which time the generator balls have moved outwardly to the extent needed to bring the large idler forwardly far enough to bring the forward teeth thereof into the space between the speed-reducing gear and the speed-increasing gear (Figure 2). This breaks the speed-reducing train and stops further alteration of the blade angle.

From the above it will be clear that there is provided mechanism in which a constant speed and hence a constant driving torque may be maintained upon the main shaft that is rotated by an air-driven propeller and which rotates a suitable device such as an electric generator.

With certain modifications within the scope of the broader features of this invention, this invention is equally applicable to an apparatus in which an engine or other prime mover is the element that drives the main shaft, and the propeller is the element that is driven by the main shaft. Such an apparatus is found in airplanes, and by the use of the present invention therewith, it is possible to maintain automatically the speed of the engine at its most efficient value regardless of the prevailing air pressure (which varies with altitude), thus avoiding the disadvantages attendant upon the variations in engine speed that are caused by variations in altitude, and accomplishing many other advantageous results.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. In apparatus of the class described, in combination, a main shaft, a propeller having blades relatively revoluble about their axis to vary the effective angle of the blades, a differential gearing for revolving said blades about said axis, a reversible differential gearing for driving said first gearing and having an idler, means for effecting rotation of said idler with respect to the main shaft, and means for connecting said idler selectively with either of the reversible trains of said second gearing to rotate the first gearing in one direction or the other and thereby shift said blades in one direction or the other with respect to their axis.

2. In apparatus of the class described, in combination, a main shaft, a propeller having blades relatively revoluble about their axis to vary the effective angle of the blades, a differential gearing for revolving said blades about said axis, a reversible differential gearing for driving said first gearing and having an idler, means for effecting rotation of said idler with respect to the main shaft, and means for connecting said idler selectively with either of the reversible trains of said second gearing to rotate the first gearing in one direction or the other and thereby shift said blades in one direction or the other with respect to their axis, said last means being operated automatically from the main shaft.

3. In apparatus of the class described, in combination, a main shaft, a propeller having blades relatively revoluble about their axis, to vary the effective angle of the blades, a differential gearing for revolving said blades about said axis, a reversible differential gearing for driving said first gearing and having an idler, means for effecting rotation of said idler with respect to the main shaft, means for connecting said idler selectively with either of the reversible trains of said second gearing to rotate the first gearing in one direction or the other and thereby shift said blades in one direction or the other with respect to their axis, and a centrifugal device rotated by the main shaft and adapted to operate said last means.

4. In apparatus of the class described, in combination, a main shaft, a propeller having blades relatively revoluble about their axis, means for shifting said blades in synchronism to vary the effective angle of the blades, a differential gearing for driving said blade-shifting means, a reversible differential gearing for driving said first gearing and having an idler, means for effecting rotation of said idler with respect to the main shaft, means for connecting said idler selectively with either of the reversible trains of said second gearing to rotate the first gearing in one direction or the other and thereby shift said blades in one direction or the other with respect to their axis, and a centrifugal device rotated by the main shaft and adapted to operate said last means.

5. In apparatus of the class described, in combination, a main shaft, a propeller having blades mounted to counterbalance each other's centrifugal force, and relatively revoluble about their axis, means for shifting said blades in synchronism to vary the effective angle of the blades, a differential gearing for driving said blade-shifting means, a reversible differential gearing for driving said first gearing and having an idler, means connected to a fixed part of the apparatus for effecting rotation of said idler with respect to the main shaft, and means for connecting said idler selectively with either of the reversible trains of said second gearing to rotate the first gearing in one direction or the other and thereby shift said blades in one direction or the other with respect to their axis, said last means being operated automatically from the main shaft.

6. In apparatus of the class described, in combination, a main shaft, a propeller having blades relatively revoluble about their axis to vary the effective angle of the blades, a reversible differential gearing for revolving said blades about said axis, and a centrifugal device rotated by the main shaft and adapted to operate said gearing.

7. In apparatus of the class described, in combination, a main shaft, a propeller having blades relatively revoluble about their axis to vary the effective angle of the blades, a reversible differential gearing for revolving said blades about said axis and having an idler, means connected to a fixed part of the apparatus for effecting rotation of said idler with respect to the main shaft, and means for connecting said idler selectively with either of the reversible trains of said gearing to shift said blades in one direction or the other with respect to their axis.

8. In apparatus of the class described, in combination, a main shaft, a propeller having blades relatively revoluble about their axis to vary the effective angle of the blades, a reversible differential gearing for revolving said blades about said axis and having an idler, means connected to a fixed part of the apparatus for effecting rotation of said idler with respect to the main shaft, and means for connecting said idler selectively with either of the reversible trains of said gearing to shift said blades in one direction or the other with respect to their axis, said last means being operated automatically from the main shaft.

In testimony whereof, I have signed my name to this specification this 1st day of March. 1919.

ALFRED VISCHER, Jr.